UNITED STATES PATENT OFFICE.

WILLIAM MORRISON, OF CHICAGO, ILLINOIS, ASSIGNOR TO THE HELIOS-UPTON COMPANY, A CORPORATION OF NEW JERSEY.

PROCESS OF FORMING ELECTRIC ACCUMULATORS.

SPECIFICATION forming part of Letters Patent No. 711,997, dated October 28, 1902.

Application filed March 18, 1901. Serial No. 51,738. (No specimens.)

*To all whom it may concern:*

Be it known that I, WILLIAM MORRISON, a citizen of the United States, residing at Chicago, county of Cook, and State of Illinois, have invented certain new and useful Improvements in Processes of Forming Electric Accumulators or Storage Batteries, (Case No. 2;) and I do hereby declare the following to be a full, clear, and exact description of the invention, such as will enable persons skilled in the art to which it appertains to make and use the same.

My invention relates to processes for forming electric accumulators or storage batteries.

In an application filed of even date herewith I claim, broadly, the use of a solution containing fluorin as a disintegrating agent in the process of forming electric accumulator elements.

In my present invention I claim the use of fluorin in solution with the chlorates and nitrates or other oxidizing compounds.

The object of my present invention is to provide a process whereby metallic-lead structures which are designed to ultimately become the active elements of a storage-battery cell may be quickly disintegrated to the desired degree as a step precedent to the formation of the usual active material, consisting of peroxid of lead and spongy lead, upon the respective negative and positive electrodes.

In the practice of my invention quick disintegration of metallic lead is accomplished, and a highly attractive and cohesive adherence of the lead salts or compounds thus formed with the metallic base is effected and maintained under all conditions, and large capacity is contributed to the finished elements.

A very comparatively high electric-current density may be employed for hastening the process without decreasing or in any manner impairing the affinity of the component parts of the structure.

In forming plates by the usual electrochemical process the metallic-lead structure is first disintegrated by a more or less vicious agent, such as nitric acid, in suitable solution of water and sulfuric acid. The sulfate of lead formed by the partial destruction of the metal support which is to be the positive electrode is then converted in a spongy lead. The desired number of these elements, such as may be designed for the negative electrodes, are treated by a means which converts the disintegrated portion into an oxid of lead. In the practice of these processes the plates are immersed in a solution of nitric acid or other like compounds, with a solution of sulfuric acid in contact with the electric current which is used for carrying the processes into effect. The plates designed to become the electrodes of the prospective cell are connected to the positive pole of the circuit from the source of current-supply. The lead plates will at once begin to be dissolved by the action of the nitric acid, which is a solvent of lead, and hastened by the electric current produces nitrate of lead. The nitrate of lead is soluble in the solution; but as a result of the affinity of the lead for the sulfuric acid contained in the solution to form a sulfate the nitrate of lead will not leave the lead plate an appreciable distance, but will be precipitated upon the lead-support and held by mechanical lodgment or a very weak cohesive attraction. This process may be continued until the required depth of formation has been obtained, or until the disintegrating agent has been consumed, after which if the current be further continued, or by removing the plates and placing them in a solution containing sulfuric acid or like solutions, in which the lead is insoluble, then continuing the current, the mass adhering to the lead-support will be converted thereby into peroxid of lead. In the first instance if the current is sufficiently dense with reference to the area of the plates affected the sulfate of lead which is produced from the nitrate will become converted into peroxid of lead during the continuation of the process, and this may occur to some extent in any event.

I have found that the peroxid or binoxid of lead, ($PbO_2$,) which is produced by converting the metallic lead first into a nitrate, $Pb(NO_3)_2$, or similar substances, then into a sulfate ($PbSO_4$,) it will be observed that the sulfate occupies a larger volume than the peroxid, due to the liberation of sulfuric acid, and as the oxidizing process has no power to contract the volume it leaves the peroxid material very porous throughout its entire mass, which is easily disintegrated by the mechanical wash of the electrolyte, and by any slight disturbance and during the natural use of such cells the active material will crumble and fall away from the metallic base.

In the old Planté process of forming accumulators or storage batteries a very durable firmly cohesive oxid of lead was produced, homogeneous throughout its mass and strongly adherent to its positive lead-support and a similar quality of spongy lead on the negative-supports; but this process requires a great many charges and reversals, extending over periods of several months, necessary to completely form a cell. This process is tedious, expensive, and too slow for modern requirements and commercial use.

In carrying my process into practical operation I produce all the desirable results obtained by the practice of the old Planté process. Besides, I am enabled to very materially hasten the process by its quick action and to increase the capacity of the plate and as a result to cheapen the production of the elements of electric accumulators.

My process produces a salt practically insoluble in the liquid or solution in which it is formed, which has a very high affinity for the lead structure, and which can be changed to an oxid or spongy lead without precipitation.

In my present invention I employ hydrofluoric acid or any of the soluble fluorids in a solution containing any of the chlorates, nitrates, or similar compounds of a highly-oxidizing nature capable of acting with the fluorids, or non-oxidizing agents—such, for instance, as acetic acid—may be successfully used in a solution with a soluble fluorid and a suitable excitant to form an electrolyte in which the lead structure may be rapidly disintegrated with the coöperation of the electric current.

I have found that the nitrates, chlorates, and similar compounds in solution with sulfuric acid or like excitants do not produce a sufficiently cohesive strongly-adhering bond of the disintegrated material within its own mass or between it and its metallic support to be practical for storage-battery uses.

When the hydrofluoric acid or other soluble fluorid is placed in a solution containing nitrates, chlorates, or a combination of them or similar compounds, by which fluorin gas is liberated by the action of the electric current, and in combination with the other gases, the fluorin and other gases will attack the plate, producing a disintegrated material strongly adhering to its support and throughout its mass. This material is afterward to be converted into an oxid of lead or spongy lead. If the fluorids are not used in the electrolyte, this mass will not possess the highly desirable adhesive qualities described. In all cases the fluorid of lead formed by the action of the fluorin gas, in combination with the other compounds of lead, provides an intimate bond of union throughout the entire mass and between the said mass and the metallic support, increasing its adhesive qualities and adding largely to the capacity of the cell. The affinity of fluorin for the lead structure under the influence of the electric current is so great and the avidity which it exerts to enter said structure, which at the time may be connected to the positive pole of an electric current, is so marked that it may be transferred from plate to plate in an electrolyte simply by reversing the direction of current through the electrolyte. The fluorin will always enter the plate connected to the positive pole of a circuit when the current is flowing, and in doing so it will perform the desirable function to which I have referred. It may be transferred from plate to plate in the manner described, and each time the desired results will follow. I have found this affinity to be so decided that there is but very little loss in the fluorin after many transfers have thus been made.

The lead structure which is to form the plate or support of the battery-electrode is connected to the positive pole of the source of electric current. The negative pole may be connected to an ordinary lead-plate placed in the solution, and a current is then passed through the electrolyte until the process has been continued for a sufficient time to materially disintegrate the lead plate. After the lead plates have been filled in this electrolyte they may then be placed in solution of sulfuric acid and water, or to hasten the process the solution may contain zinc or any other metal capable of being deposited on the plate, which the local action caused by the effect of the sulfuric acid will dissolve and produce nascent hydrogen, by the action of which spongy lead is produced in the plate, or there are a great many reducing agents known to the art—such as tartaric acid, oxalic acid, of which there are many others—may be added to the solution to assist the reduction and to more completely reduce the disintegrated substance to the original lead of a spongy nature in a shorter time. The current should be reversed with respect to the plates, and the fluorid of lead and other salts mayhap will thereby be converted into spongy lead. After these spongy-lead plates have been assembled in alternate series, as usual in storage-battery cells, and placed in the usual solution of sulfuric acid and water the series composing the negative plates will by the passage of the charging-current through the cell for a few hours cause the spongy lead to be converted into peroxid of lead, after which the cell is ready for regular service.

Having described my invention, what I claim as new, and desire to secure by Letters Patent of the United States, is—

1. A step in a process of producing active material, or material to become active, upon a lead structure for electric accumulators, which consists in partially disintegrating the lead structure in a solution containing a soluble fluorid and a nitrate, by passing a current of electricity from an extraneous source through said solution, substantially as set forth.

2. A step in a process of producing active material, or material to become active, upon a lead structure for electric accumulators, which consists in partially disintegrating the lead structure in a solution in which lead is practically insoluble, containing a soluble fluorid and a nitrate or a compound thereof, or their equivalents, by passing a current of electricity from an extraneous source through said solution, substantially as set forth.

3. A step in a process of producing active material, or material to become active, upon a lead structure for electric accumulators, which consists in partially disintegrating the lead structure in a solution of sulfuric acid and water containing a soluble fluorid and a nitrate, by passing a current of electricity from an extraneous source through said solution, substantially as set forth.

4. A step in a process of producing active material, or material to become active, upon a lead structure for electric accumulators, which consists in partially disintegrating the lead structure in a solution of sulfuric acid and water and another acid, containing a soluble fluorid and a nitrate, by passing a current of electricity from an extraneous source through said solution, substantially as set forth.

5. A step in a process of producing active material, or material to become active, upon a lead structure for electric accumulators, which consists in partially disintegrating the lead structure in a solution of sulfuric acid and water, or other acids containing a soluble fluorid and a nitrate, by passing a current of electricity from an extraneous source through said solution, substantially as set forth.

In testimony whereof I have signed this specification, in the presence of two subscribing witnesses, this 7th day of February, A. D. 1901.

WILLIAM MORRISON.

Witnesses:
FORÉE BAIN,
M. F. ALLEN.